US008228548B2

(12) United States Patent
Saida

(10) Patent No.: US 8,228,548 B2
(45) Date of Patent: Jul. 24, 2012

(54) MULTIPLEX SYSTEM AND IMAGE PROCESSING APPARATUS WITH DATA READ CONTROL

(75) Inventor: Yukihiro Saida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1029 days.

(21) Appl. No.: 12/181,417

(22) Filed: Jul. 29, 2008

(65) Prior Publication Data
US 2009/0051951 A1 Feb. 26, 2009

(30) Foreign Application Priority Data

Aug. 24, 2007 (JP) ................................. 2007-218389

(51) Int. Cl.
*G06K 15/00* (2006.01)
(52) U.S. Cl. ................ 358/1.16; 358/1.15; 358/404
(58) Field of Classification Search .............. 382/325; 358/404
See application file for complete search history.

(56) References Cited

U.S. PATENT DOCUMENTS

| 6,449,056 | B1* | 9/2002 | Mishima et al. | 358/1.16 |
| 6,816,279 | B1* | 11/2004 | Izumi et al. | 358/1.16 |
| 2001/0043761 | A1* | 11/2001 | Shimizu et al. | 382/325 |
| 2002/0118376 | A1* | 8/2002 | Mishima et al. | 358/1.6 |
| 2003/0011821 | A1* | 1/2003 | Obata et al. | 358/1.16 |
| 2003/0081253 | A1* | 5/2003 | Sekiguchi et al. | 358/1.16 |
| 2003/0133154 | A1* | 7/2003 | Ohyama et al. | 358/1.15 |
| 2005/0122539 | A1* | 6/2005 | Sugimoto | 358/1.15 |
| 2007/0121161 | A1* | 5/2007 | Yamada | 358/1.16 |
| 2007/0211290 | A1* | 9/2007 | Sekiguchi et al. | 358/1.16 |

FOREIGN PATENT DOCUMENTS

| JP | 8-009118 A | 1/1996 |
| JP | 08-340421 A | 12/1996 |
| JP | 09-294185 A | 11/1997 |
| JP | 2003-219115 A | 7/2003 |

* cited by examiner

*Primary Examiner* — Twyler Haskins
*Assistant Examiner* — Nicholas Pachol
(74) *Attorney, Agent, or Firm* — Panitch Schwarze Belisario & Nadel LLP

(57) ABSTRACT

A multiplex system such as copying system is supplied capable of improving read speed. The multiplex system comprises a scanner to read manuscript and generate image data, and a printer to print the image data generated by the scanner; in the scanner, a scan page data storing section stores the image data; in the printer, a scanner controlling section controls status information of the scan page data storing section, and outputs a read instruction of one page manuscript to the scanner on the basis of the status information.

12 Claims, 11 Drawing Sheets

| INFORMATION | SCAN ABILITY |
|---|---|
| READ SPEED INFORMATION | 3inch / sec (SCANNER CAPABLE OF READING ABOUT 15 SHEETS OF A4 PAPER PLACED LENGTHWISE PER MINUTE ) |
| READ DATA USE MEMORY SIZE INFORMATION | 150M BYTE |
| DESIGNATION POSSIBLE RESOLUTION (MIN) INFORMATION | 100pixcel / inch |
| DESIGNATION POSSIBLE RESOLUTION (MAX) INFORMATION | 600pixcel / inch |
| ADF UNIT EXISTENCE / INEXISTENCE INFORMATION | EXISTENCE |
| FB UNIT EXISTENCE/INEXISTENCE INFORMATION | EXISTENCE |

*FIG. 2*

| COPY CONDITION | READ CONDITION | | PRINT CONDITION |
|---|---|---|---|
| RESOLUTION : 600dpi | MAIN SCAN RESOLUTION : 600dpi | | RESOLUTION : 600dpi |
| | AUXILIARY SCAN RESOLUTION : 600dpi | | |
| MANUSCRIPT SIZE : A4 LENGTHWISE PLACEMENT | MAIN SCAN READ LENGTH : 4960pixcel | | MANUSCRIPT SIZE : A4 |
| | AUXILIARY SCAN READ LENGTH : 7015pixcel | | |
| Color/Mono DESIGNATION : Color | — | | Color/Mono : Color |
| — | OUTPUT FORMAT : RGB 8bit | | — |

*FIG. 3*

| INFORMATION | SCAN ABILITY |
|---|---|
| READ SPEED INFORMATION | 3inch / sec (SCANNER CAPABLE OF READING ABOUT 15 SHEETS OF A4 PAPER PLACED LENGTHWISE PER MINUTE ) |
| READ DATA USE MEMORY SIZE INFORMATION | 20M BYTE |
| DESIGNATION POSSIBLE RESOLUTION (MIN) INFORMATION | 100pixcel / inch |
| DESIGNATION POSSIBLE RESOLUTION (MAX) INFORMATION | 600pixcel / inch |
| ADF UNIT EXISTENCE / INEXISTENCE INFORMATION | EXISTENCE |
| FB UNIT EXISTENCE/INEXISTENCE INFORMATION | EXISTENCE |

*FIG. 10*

MULTIPLEX SYSTEM AND IMAGE PROCESSING APPARATUS WITH DATA READ CONTROL

BACKGROUND OF THE INVENTION

1. Field of the Invention

The invention relates to a multiplex system and an image processing apparatus that respectively comprise scanning device and printing device.

2. Related Background Art

Conventionally, a copying device uses a load memory through dividing it into a read image data storing area (to store image data of one page part) and a big capacity area used for store other data. Then, in the case to execute a continuous copy, according to progress status of print, first is to start a read without considering the state of the read image data storing area. When inputting the image data obtained by the read, if the read image data storing area is in use, the image data is temporarily stored into the big capacity area. Thus, it is possible to prevent copy operation from stopping due to an error of memory overflow.

Patent document 1: Japan patent publication H08-009118.

However, in the case that a scanning device and a printing device construct a system via communication line, the scanning device can not estimate the progress status of the printing device. Thereby, the scanning device can not start a read without considering memory state. Only after confirmed that the memory which is furnished on the self side and corresponds to the read image data storing area is sufficiently emptied, the read can be started. As a result, when reading manuscript, it is necessary to spend a great of time.

SUMMARY OF THE INVENTION

It is, therefore, an object of the invention to provide a multiplex system and an image processing apparatus capable of solving the above problem.

According to an aspect of the invention, a multiplex system is provided, which comprises a scanning device to read manuscript and generate image data; and a printing device to print the image data generated by the scanning device, wherein the scanning device has a storing section to store the image data; and the printing device has a scanner controlling section to outputs a read instruction of manuscript to the scanning device on the basis of status information of the storing section.

Further, according to an aspect of the invention, a multiplex system is also provided, which comprises a scanning device to read manuscript and generate image data; and a printing device to print the image data generated by the scanning device, wherein the printing device has a storing section to store the image data; and a scanner controlling section to outputs a read instruction of manuscript to the scanning device on the basis of status information of the storing section.

Further, according to another aspect of the invention, an image processing apparatus is provided, which comprises a scanning unit to read manuscript and generate image data; and a printing unit to print the image data generated by the scanning unit, wherein the scanning unit has a storing section to store the image data; and the printing unit has a scanner controlling section to outputs a read instruction of manuscript to the scanning unit on the basis of status information of the storing section.

Moreover, in the multiplex system or the image processing apparatus, the scanner controlling section may include a means to calculate an image data transfer ability between the printing unit and the scanning unit; a means to calculate an image data size of one page part read by the scanning unit according to a read condition; a means to calculate an image data read ability of the scanning unit according to a read condition; and a means to calculate a memory empty capacity in the scanning unit.

Moreover, in the multiplex system or the image processing apparatus, the scanning device/unit may start to read manuscript according to a read instruction of the printing unit.

Effect of the Prevent Invention

According to the present invention, the printing device includes a scanner controlling section that can calculates a state (it is possible to start a read) which enables the image data read by scanning to be written into memory on the basis of performance or state of self side and the scanning device; and can outputs an instruction to the scanning device to read the next manuscript. Therefore, it is possible to improve read speed.

The above and other objects and features of the present invention will become apparent from the following detailed description and the appended claims with reference to the accompanying drawings.

BRIEF DESCRIPTION OF THE DRAWINGS

FIG. 2 is an explanation diagram of scanner unit formation information of embodiment 1 of the present invention;

FIG. 3 is a relationship explanation diagram among copy condition, read condition and print condition in embodiment 1 of the present invention;

FIG. 10 is an explanation diagram of scanner unit formation information of embodiment 2 of the present invention;

DETAILED DESCRIPTION OF THE PREFERRED EMBODIMENTS

Embodiments of the invention will be described in detail hereinbelow with reference to the drawings.

Embodiment 1

Figure 1:
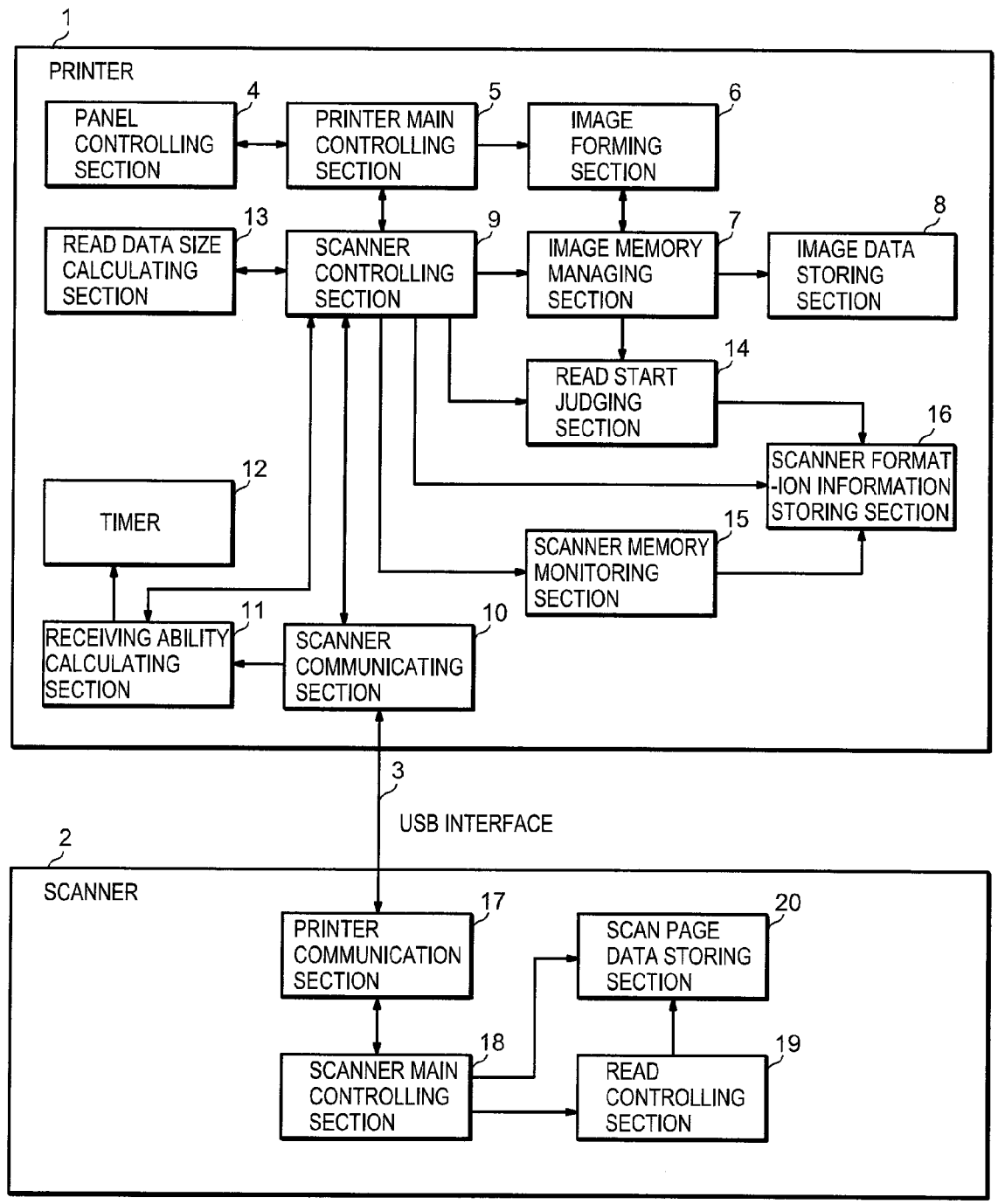
FIG. 1 is a block diagram showing a structure of a multiplex system in embodiment 1 of the present invention.

Explanation of Structure:

FIG. 1 is a block diagram showing a structure of a multiplex system in embodiment 1 of the present invention.

In the embodiment, the multiplex system is a copying system.

As shown by FIG. 1, a multiplex system in embodiment 1 is formed through a printer 1 serving as a printing device is connected with a scanner 2 serving as an image reading device via USB interface 3. That is, in the multiplex system, the printer 1 and the scanner 2 serve as two separate devices to connect via the USB interface 3, so a read instruction is sent from the printer 1 to the scanner 2. First is to explain structure of the printer 1 in detail, second is to explain structure of the scanner 2 in detail.

The printer 1 includes a panel controlling section 4, a printer main controlling section 5, an image forming section 6, an image memory managing section 7, an image data storing section 8, a scanner controlling section 9, a scanner communicating section 10, a receiving ability calculating section 11, a timer 12, a read data size calculating section 13, a read start judging section 14, a scanner memory monitoring section 15 and a scanner formation information storing section 16.

The panel controlling section 4 is a part that is composed of a operating portion (keyboard or the like) to receive copy request from user and a displaying portion (liquid crystal displayer or the like) to display device state to user so as to perform a function of man-machine interface between the system and user.

The printer main controlling section 5 is a part that performs control to get synchronization with the panel controlling section 4, the image forming section 6 and the scanner controlling section 9, and to print image data obtained from the scanner 2 onto medium.

The image forming section 6 is a part that obtains image data from the image memory managing section 7 and prints the image data onto medium.

The image memory managing section 7 is a part that manages the image data storing section 8.

The image data storing section 8 is a part that stores image data obtained from the scanner 2.

The scanner controlling section 9 is a part that controls manuscript read of the scanner 2.

The scanner communicating section 10 is a part that performs communication of control command and image data with the scanner 2.

The receiving ability calculating section 11 is a part that calculates image data transmission speed between the printer 1 and the scanner 2.

The timer 12 is a time counting unit used when calculating the transmission speed by the receiving ability calculating section 11.

The read data size calculating section 13 is a part that calculates image data size of one page read by the scanner 2 according to a read condition (it will be explained in detail below) inputted by the panel controlling section 4.

The read start judging section 14 is a part that judges what timing to instruct a read with respect to the scanner 2.

The scanner memory monitoring section 15 is a part that monitors memory empty status of the scanner 2.

The scanner formation information storing section 16 is a part that stores formation information obtained from the scanner 2.

The scanner 2 includes a printer communication section 17, a scanner main controlling section 18, a read controlling section 19 and a scan page data storing section 20.

The printer communication section 17 is a part that performs communication of control command and image data with the printer 1.

The scanner main controlling section 18 is a part that controls the read controlling section 19 through command received by the printer communication section 17 to send image data that has been read to the printer 1.

The read controlling section 19 is a part that reads manuscript set on the scanner 2, and stores its image data into the scan page data storing section 20.

The scan page data storing section 20 is a memory that has a capacity capable of at least storing image of one page part when the scanner 2 reads manuscript according to a maximum manuscript size and a maximum resolution.

Explanation of Operation:

The multiplex system explained above performs the following operations.

First is to explain a relationship among a copy condition, a read condition and a print condition of scanner unit formation information needed for operation explanation.

FIG. 2 is an explanation diagram of scanner unit formation information of embodiment 1 of the present invention.

The scanner unit formation information is formation information stored in the scanner formation information storing section 16 of the printer 1, and is composed of the following respective information.

As shown by FIG. 2, read speed information represents a read speed of the scanner 2. Read data use memory size information represents a size assigned as a storing area size of image data read by the scanner 2. Designation possible resolution (MIN) information represents a minimum value of resolution which can be designated to read and is supported by the scanner 2. Designation possible resolution (MAX) information represents a maximum value of resolution which can be designated to read and is supported by the scanner 2. ADF unit existence/inexistence information represents whether support of Auto Document Feeder (Hereinafter: ADF) in the scanner 2 exists or not. FB unit existence/inexistence information represents whether support of Flat Bed (Hereinafter: FB) in the scanner 2 exists or not.

These information are previously registered in the printer 1. However, it is possible to store these information in the scanner 2, and to obtain them through a communication between the printer 1 and the scanner 2.

FIG. 3 is a relationship explanation diagram among copy condition, read condition and print condition in embodiment 1 of the present invention.

As shown by FIG. 3, a relationship among a copy condition, a read condition and a print condition is previously decided. The relationship is set by user via the panel controlling section 4 of the printer 1. It is possible to obtain the relationship from an initial setting value.

The following is to explain operation summary of the multiplex system in the embodiment 1 by returning to FIG. 1.

In a state that power source is turned on or the printer 1 stands up, when the scanner communicating section 10 recognized that the scanner 2 is connected, the scanner communicating section 10 notifies the scanner controlling section 9 of a connection of the scanner 2.

The scanner controlling section 9 which is notified that the scanner 2 is connected, obtains the formation information (FIG. 2) from the scanner 2, stores the formation information into the scanner formation information storing section 16, and notifies the printer main controlling section 5 that the scanner 2 is connected. The printer main controlling section 5 which is notified that the scanner 2 is connected, notifies the panel controlling section 4 to display an operation scene for using the scanner 2 to realize a copy function. Through such operation, a copy function will be realized.

After user inputted copy instruction via an operator panel (not shown) and the panel controlling section 4 sends a notification of information of copy condition, the printer 1 notifies the printer main controlling section 5 that copy is requested to execute. The printer main controlling section 5 that has received the copy execution notification, sets a read condition (FIG. 3) needed for reading and a print condition needed for printing from the information of the copy condition. Then, the printer main controlling section 5 notifies the scanner controlling section 9 of information of the read condition and instructs the scanner controlling section 9 to start process. At that time, the printer main controlling section 5 further notifies image forming section 6 of information of the print condition and instructs the image forming section 6 to start process. The following is to explain operation of a read controlling process.

Figure 4:
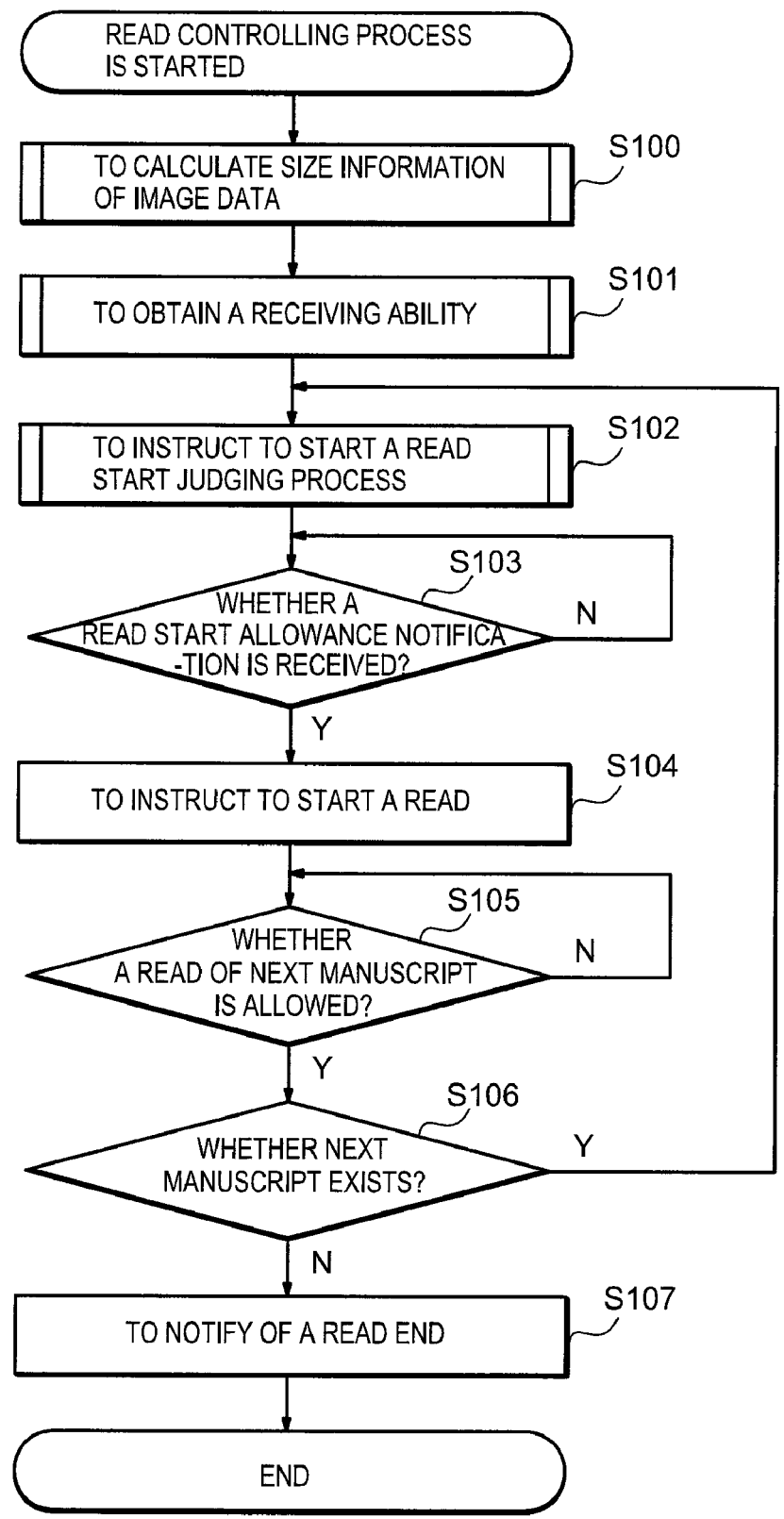
FIG. 4 is a flowchart of read controlling process in embodiment 1 of the present invention.

FIG. 4 is a flowchart of read controlling process in embodiment 1 of the present invention.

Regarding the read controlling process, it will be explained from step S100 to step S107 together with using FIG. 1.

Step S100:

The scanner controlling section 9 sends the information of the read condition (FIG. 3) to the read data size calculating section 13, and obtains an image data size of one page (hereinafter: read input size) inputted from the scanner 2 (Step S100). Moreover, as a concrete example, a calculation method of a read input size of A4 manuscript based on the read condition of FIG. 3 is expressed as follows:

$$\text{Read input size} = \qquad \text{(Expression 1)}$$
$$\text{main scan read length} \times \text{auxiliary scan read length} \times$$
$$8(\text{depth per pixel}) \times 3(\text{plain number: } RGB) \div 8$$
$$(\text{byte conversion}) = 4960 \times 7015 \times 8 \times 3 \div 8 =$$
$$104383200 \text{ Byte(about 99.5 MByte)}.$$

Step S101:

The scanner controlling section 9 obtains receiving ability information from the receiving ability calculating section 11. Regarding the content of receiving ability calculating process, it will be explained by using other flowchart after ended the explanation of FIG. 4.

Step S102:

The scanner controlling section 9 notifies the read start judging section 14 of the read input size obtained from the read data size calculating section 13, and instructs the read start judging section 14 to start a read start judging process. Regarding the content of the read start judging process, it will be explained by using other flowchart after ended the explanation of FIG. 4.

Step S103:

The scanner controlling section 9 waits for a read start allowance notification from the read start judging section 14.

Step S104:

The scanner controlling section 9, after received the read start allowance notification from the read start judging section 14, instructs the scanner 2 to start read via the scanner communicating section 10.

Step S105:

The scanner controlling section 9 waits for a read allowance notification of next manuscript from the scanner 2 via the scanner communicating section 10.

Step S106:

The scanner controlling section 9, after received the read allowance notification of next manuscript from the scanner 2, inquires the scanner 2 whether next manuscript exists or not; if the next manuscript exists, the scanner controlling section 9 returns to step S102 to instruct the read start judging section 14 to start the read start judging process again; if the next manuscript does not exist, the scanner controlling section 9 executes step S107.

Step S107:

The scanner controlling section 9 sends a read end notification to the printer main controlling section 5, and the printer main controlling section 5 notifies the image forming section 6 to start process. The image forming section 6 obtains image data from the image data storing section 8 through the image memory managing section 7 and generates data of one page part, then controls an image formatting mechanism (not shown) to print the data onto medium. The image forming section 6, after all print is ended, sends a print end notification to the printer main controlling section 5. The printer main controlling section 5, after respectively received the read end notification and the print end notification from the scanner controlling section 9 and the image forming section 6, judges that copy is ended, then, ends the flow.

Figure 5:
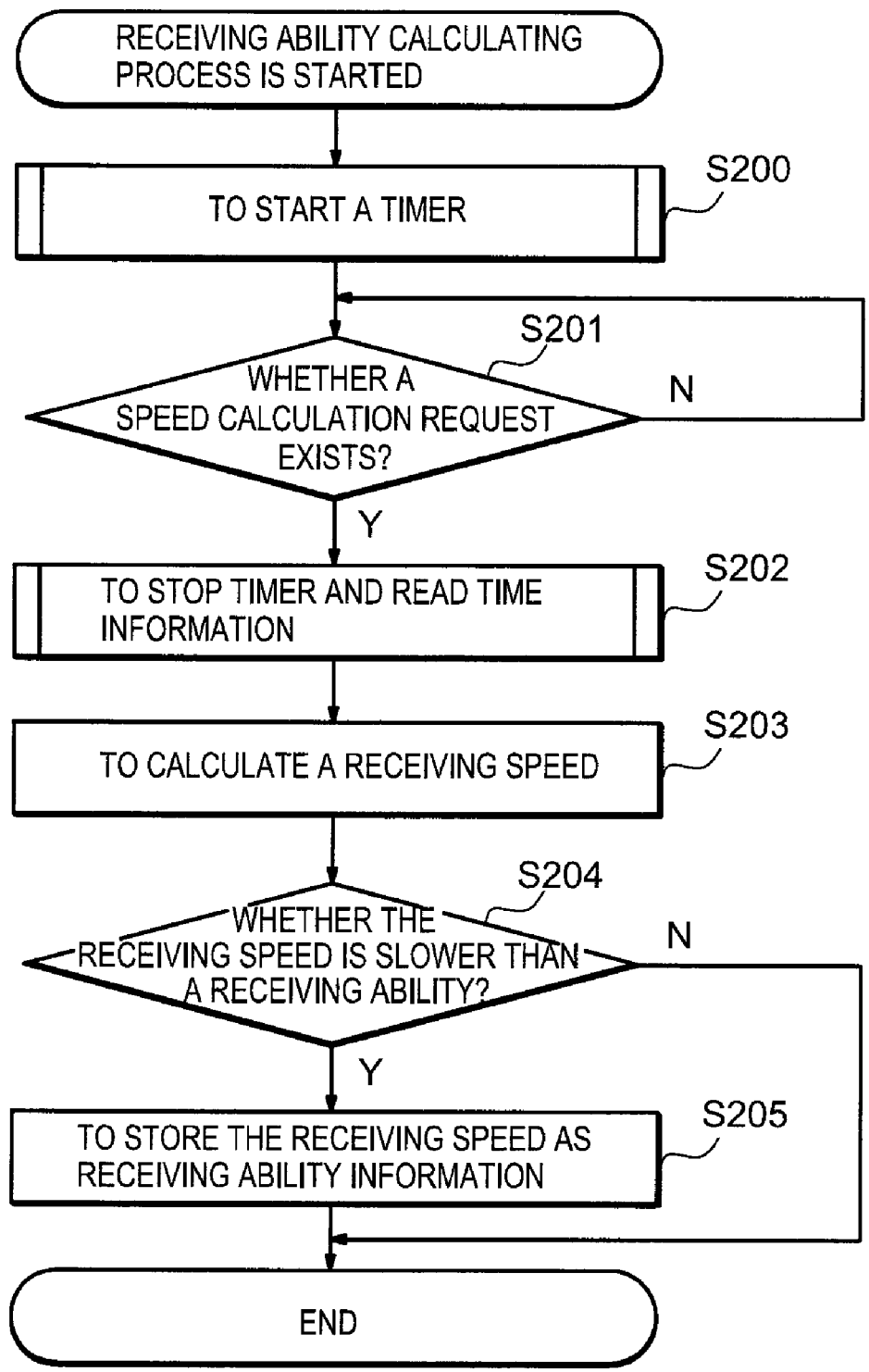
FIG. 5 is a flowchart of receiving ability calculating process in embodiment 1 of the present invention.

FIG. 5 is a flowchart of receiving ability calculating process in embodiment 1 of the present invention.

Regarding the receiving ability calculating process (step S101), it will be explained from step S200 to step S205 together with using FIG. 1.

Step S200:

The receiving ability calculating section 11, when instructed by the scanner controlling section 9 to start process, starts the timer 12.

Step S201:

The receiving ability calculating section 11 waits for a speed calculation request from the scanner controlling section 9.

Step S202:

The receiving ability calculating section 11, after received the speed calculation request from the scanner controlling section 9, stops the timer 12 and reads out time information from the timer 12.

Step S203:

The receiving ability calculating section 11 calculates a receiving speed of this time on the basis of the receiving byte size received together with the speed calculation request from the scanner controlling section 9 and on the basis of the time information obtained from the timer 12.

Step S204:

The receiving ability calculating section 11 compares the receiving speed of this time with receiving ability information; if the receiving speed of this time is slower, step S205 is executed; otherwise, the flow is ended.

Step S205:

Because the receiving speed of this time is slower than the receiving ability information, the receiving ability calculating section 11 stores the receiving speed of this time as receiving ability information and ends the flow.

Moreover, as an example, in the case that the receiving byte size received from the scanner controlling section 9 is 10 MByte (10×1024×1024 Byte) and the time obtained from the timer 12 is 2 second, the receiving ability information is as follows:

$$\text{Receiving ability information} = \qquad \text{(Expression 2)}$$
$$\text{receiving byte size} \div \text{time measured by timer} =$$
$$10 \times 1024 \times 1024 \div 2 =$$
$$5242880 \text{ Byte/Sec(5 MByte/Sec)}.$$

Figure 6:
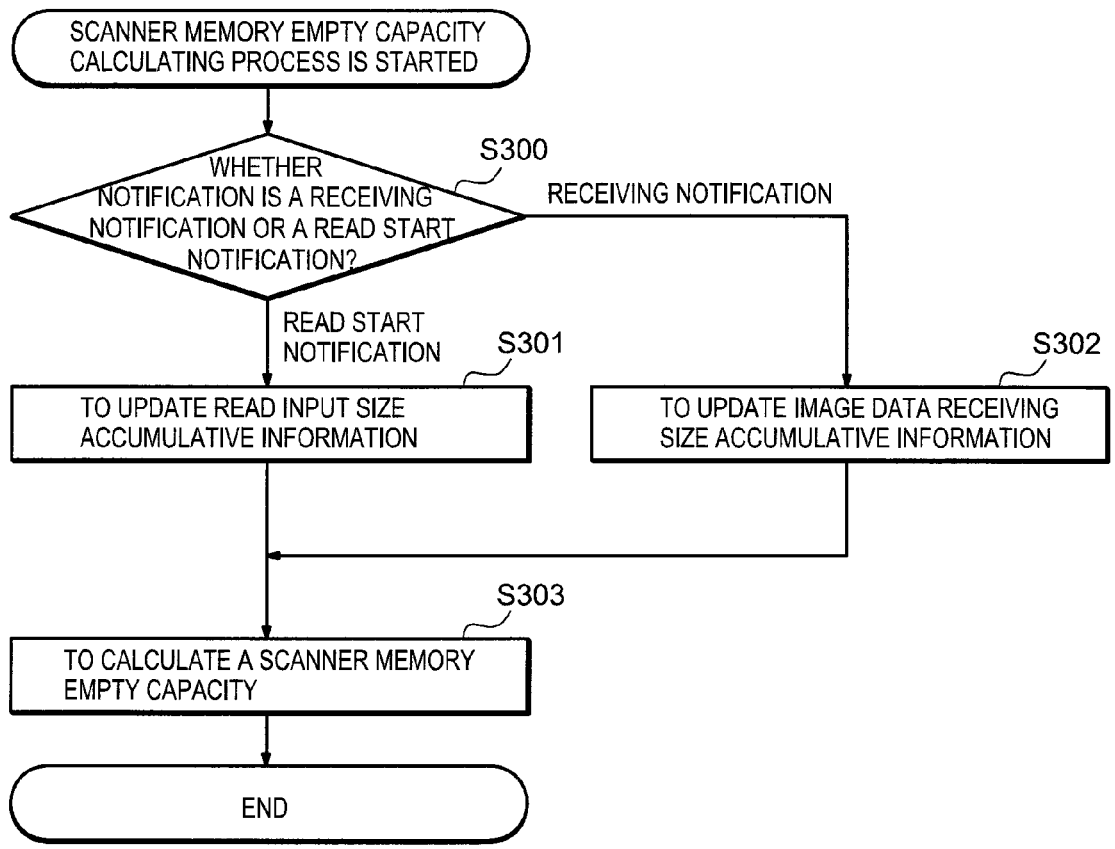
FIG. 6 is a flowchart of scanner memory empty capacity calculating process in embodiment 1 of the present invention.

FIG. 6 is a flowchart of scanner memory empty capacity calculating process in embodiment 1 of the present invention.

Regarding the scanner memory empty capacity calculating process, it will be explained from step S300 to step S302 together with using FIG. 1. The process is used in read start instruction judging process (step S102) explained below.

Step S300:

The scanner memory monitoring section 15, when started process, firstly judges a sort of notification from the scanner controlling section 9; if the notification is a read start notification, executes step S301; if it is a receiving notification, executes step S302. Here, the scanner memory monitoring section 15 is set to have a read input size accumulative information which is an accumulative size of read input size instructed to read for the scanner 2 and have an image data receiving size accumulative information which is an accumulative size of image data received from the scanner 2.

Step S301:

The scanner memory monitoring section 15, when judged that the notification sort from the scanner controlling section 9 is read start notification, adds the read input size notified together with the read start notification to the read input size accumulative information.

Step S302:

The scanner memory monitoring section 15, when judged that the notification sort from the scanner controlling section 9 indicates read data receiving notification, adds receiving image data size which is notified together with read data receiving notification into the read input size accumulative information.

Step S303:

The scanner memory monitoring section 15 calculates an empty capacity of scanner memory from read data use memory size information, read input size accumulative information and image data receiving size accumulative information in the scanner formation information storing section 16, and ends the flow. Moreover, the empty capacity of the scanner memory is calculated from the following expression:

Empty capacity of the scanner memory=Read data use memory size information−(Read input size accumulative information−Image data receiving size accumulative information)

Figure 7:
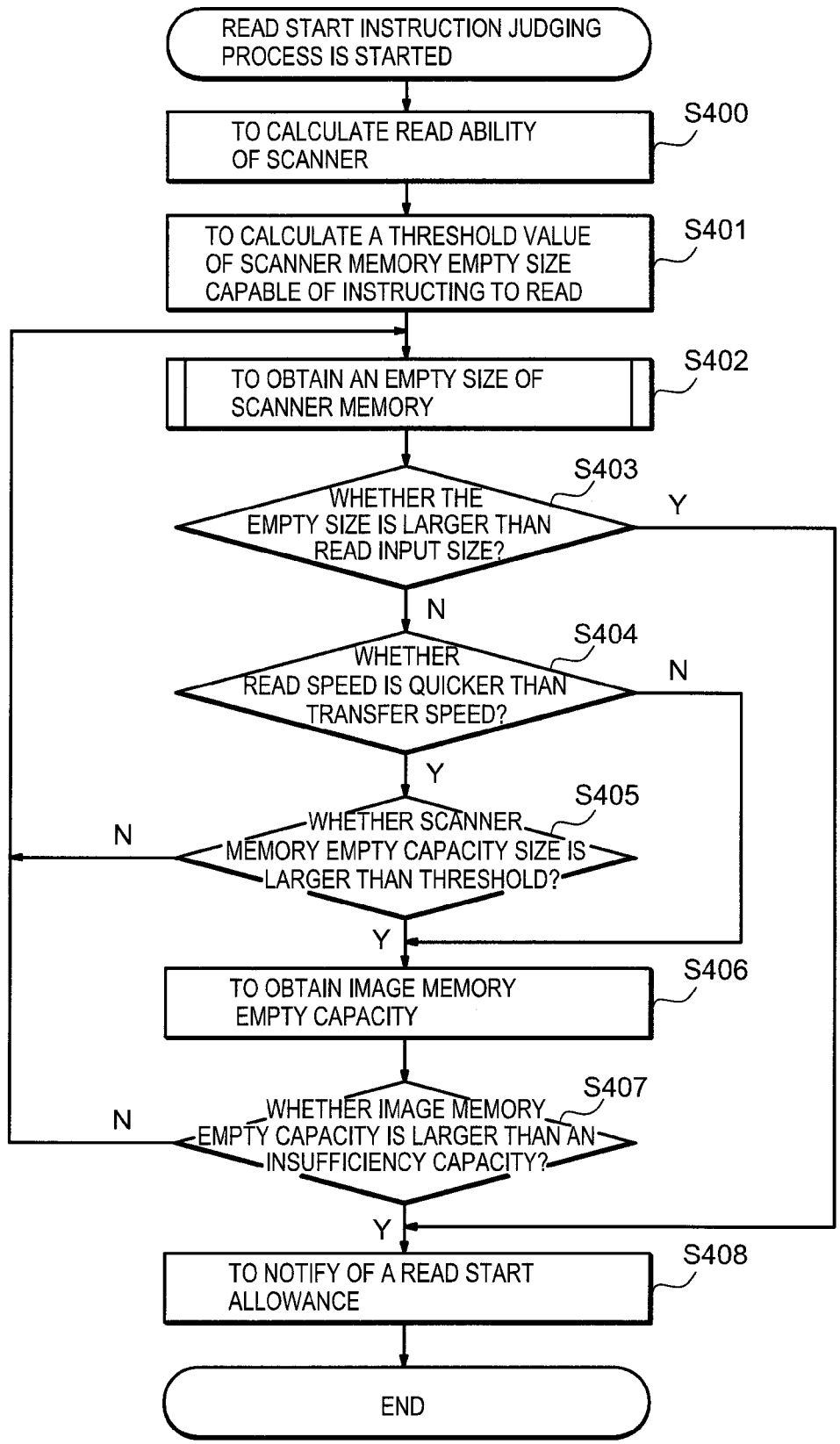
FIG. 7 is a flowchart of read start judging process in embodiment 1 of the present invention.

FIG. 7 is a flowchart of read start judging process in embodiment 1 of the present invention.

Regarding the read start judging process, it will be explained in detail from step S400 to step S408 according to a step order together with using FIG. 1.

Step S400:

The read start judging section 14 calculates read ability information from read speed information and read condition obtained from the scanner formation information storing section 16 according to the following expression. Moreover, a concrete result under conditions of FIGS. 2 and 3 is also shown below.

Read ability information =    (Expression 3)

read input information÷time spent for reading one page = read input information÷

$\left(\dfrac{\text{auxiliary scan read length}÷}{\text{resolution}÷\text{read speed information}}\right) =$ 104383200÷(measurement area÷600÷3) =

26784000 Byte(about 25 MB/sec).

Step S401:

The read start judging section 14 calculates a threshold value to allow a read with respect to the empty size of scanner memory, from the receiving ability information (expression 2) which is notified together with start instruction outputted from the scanner controlling section 9; the read input size information (expression 1) and the read ability information (expression 3), according to the following calculation expression. Moreover, threshold values of read ability information and receiving ability information related to A4 size paper that is placed lengthwise and has been previously explained are also expressed below.

Threshold = read input size information×    (Expression 4)

$\left(1 - \dfrac{\text{receiving ability information}}{\text{read ability information}}\right) =$ $104383200 \times \left(\dfrac{1-5242880}{26784000}\right) =$ 83950532 Byte(about 80 MByte).

Note: in the case that the receiving ability is quicker than the read speed, the threshold is set into "0".

Step S402:

The read start judging section 14 obtains empty size information of scanner memory from the scanner memory monitoring section 15. Here, the calculating process of empty size information of scanner memory has been explained above by referring to FIG. 6.

Step S403:

The read start judging section 14 compares the read input size with the empty size information of read memory; if the read input size is larger than the empty size information of read memory, executes step S408; if the read input size is not larger than the empty size information of read memory, executes step S404.

Step S404:

The read start judging section 14 compares the read speed information with the receiving ability information; if read speed is faster than transfer speed, executes step S405; if it is not, executes step S406.

Step S405:

The read start judging section 14 compares the empty size of scanner memory with the threshold value; if the empty size of scanner memory is larger than the threshold value, executes step S06; if it is not, returns to step S402.

Step S406:

The read start judging section 14, in the case that the receiving ability is faster than the read speed, or the empty size of scanner memory is larger than the threshold value, obtains an image memory empty capacity from the image memory managing section 7.

Step S407:

The read start judging section 14 compares an insufficiency capacity of empty size of scanner memory (i.e. read input size—read memory empty capacity) with the image memory empty capacity; if the image memory empty capacity is larger than the insufficiency capacity of empty size of scanner memory, executes step S408; if it is not, returns to step S402.

Step S408:

The read start judging section 14 judges that an area is empty, which corresponds to the part storing the read input size and is in the scan page data storing section 20, when the scanner is reading; and sends a read start allowance notification to the scanner controlling section 9; then, ends the flow.

Figure 8:
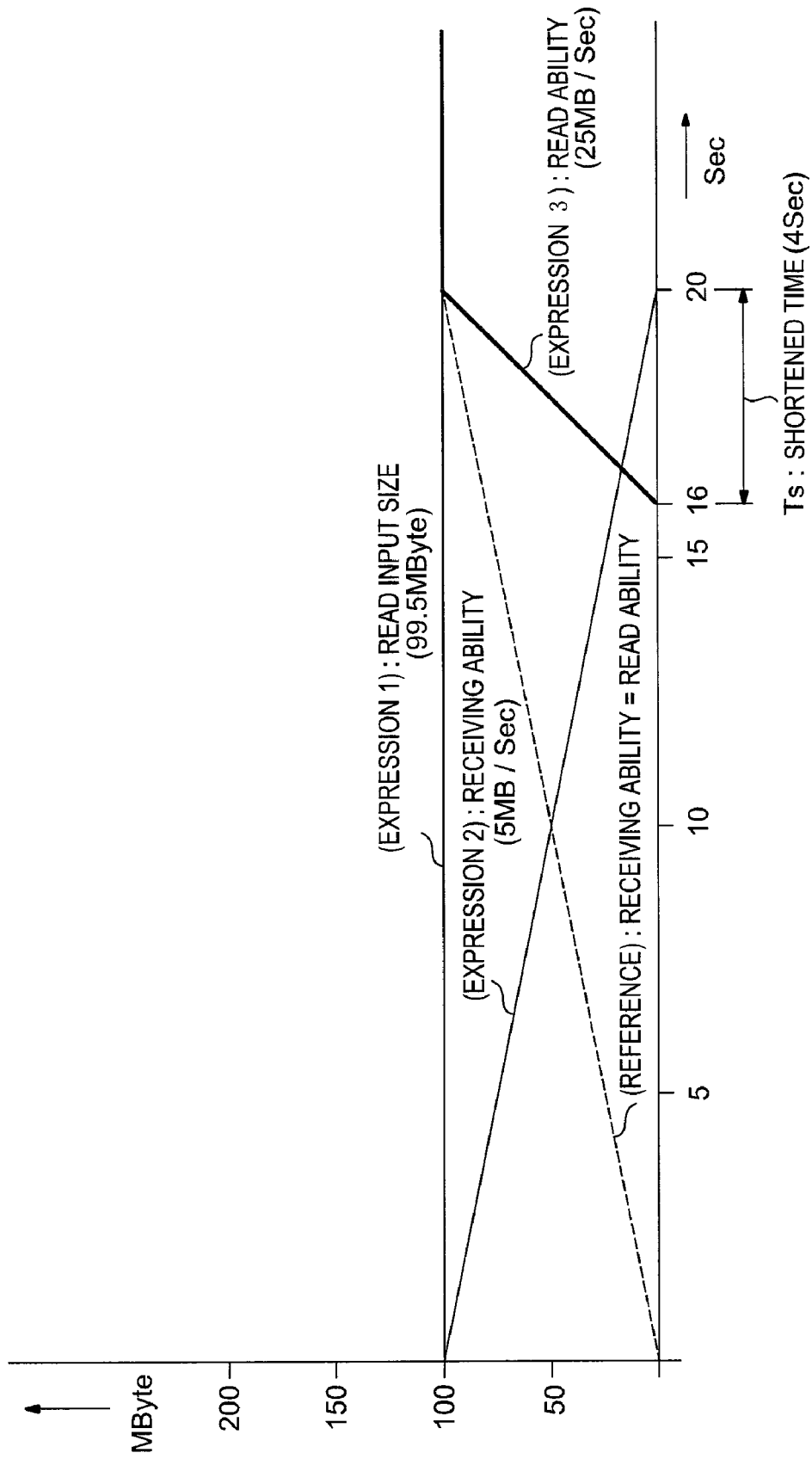
FIG. 8 is a function explanation diagram of embodiment 1 of the present invention.

FIG. 8 is a function explanation diagram of embodiment 1 of the present invention.

In the FIG. 8, a horizontal axis indicates data size (MByte); a vertical axis indicates read end time (sec). As an example, as stated in the above operation explanation, in the case that the read input size is about 99.5 MByte (expression 1), the receiving ability is about 5 MByte/sec (expression 2), and the read ability is about 25 MByte/sec (expression 3), a data store state is shown from that image data of previous page about 99.5 MByte is stored into the scan page data storing section 20 to that a read of next page is ended. As shown by FIG. 8, according to the embodiment, Ts time is shortened than the prior technology. Here, in order to shorten the Ts time, it is important to decide a read start timing of the read start judging section 14. Moreover, as a reference example, in the case that receiving ability is equal to read ability, shortening ability will become maximum.

Explanation of Effect

As stated above, according to the embodiment, it is possible to estimate an adding speed of empty size of image memory from print performance of printer and communication speed; to judge a read start time from performance of scanner and read size so as to enable image data to be completely stored; and to send a read start instruction from printer to scanner. Therefore, through controlling a store toward memory and an obtainment from memory before memory becomes sufficiently empty, it is possible to hasten a read end.

Embodiment 2

Figure 9:
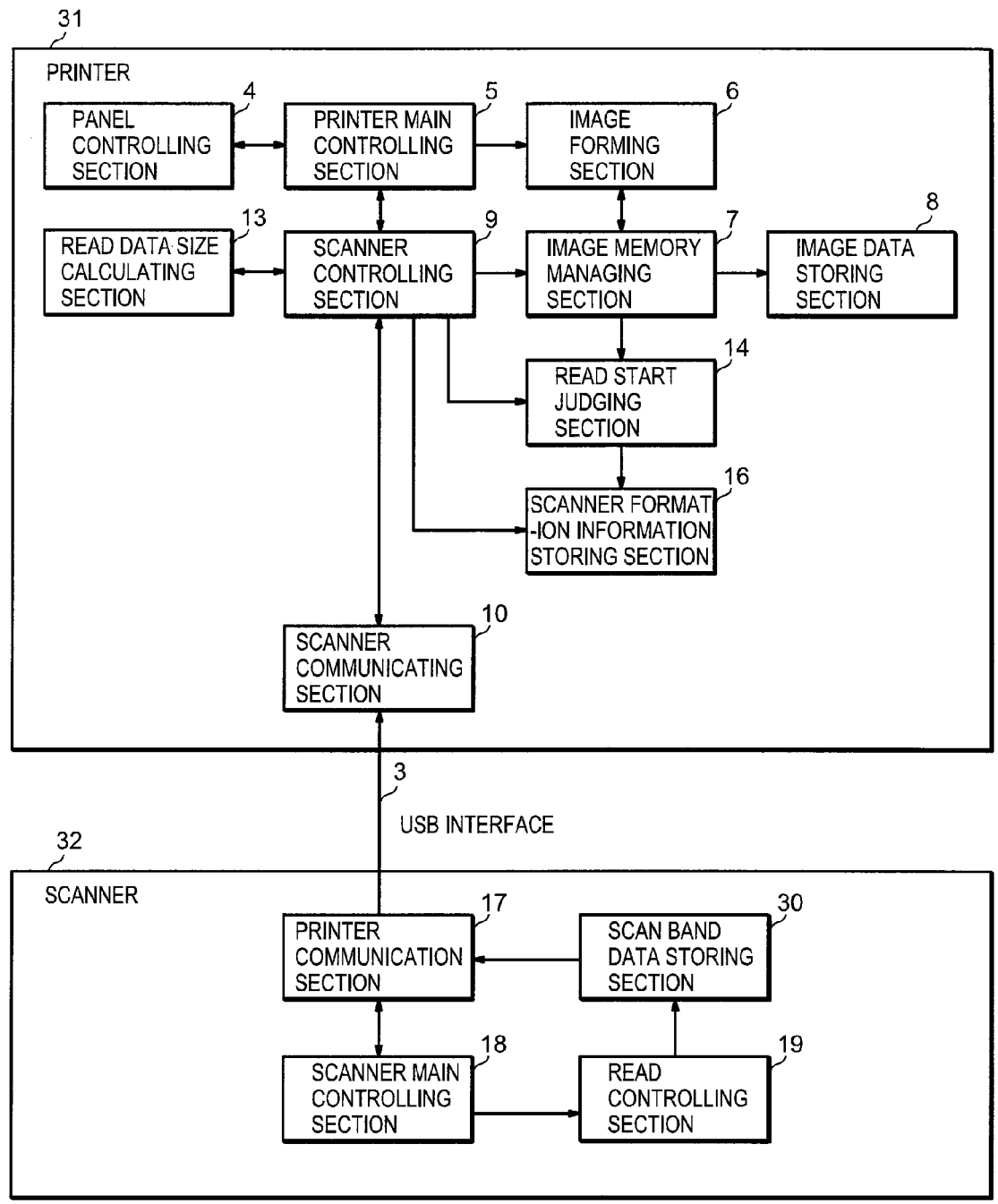
FIG. 9 is a block diagram showing a structure of a multiplex system in embodiment 2 of the present invention.

Explanation of Structure:

FIG. 9 is a block diagram showing a structure of a multiplex system in embodiment 2 of the present invention.

In the embodiment, the multiplex system also is a copying system.

As shown by FIG. 9, a multiplex system in embodiment 2 is formed through a printer 31 serving as a printing device is connected with a scanner 32 serving as an image reading device via USB interface 3. First is to explain structure of the printer 31 in detail, second is to explain structure of the scanner 32 in detail.

The printer 31 includes a panel controlling section 4, a printer main controlling section 5, an image forming section 6, an image memory managing section 7, an image data storing section 8, a scanner controlling section 9, a scanner communicating section 10, a read data size calculating section 13, a read start judging section 14, and a scanner formation information storing section 16. That is, the structure of the embodiment 2 is formed from embodiment 1 by deleting functions of a receiving ability calculating section 11, a timer 12, and a scanner memory monitoring section 15. Because all compositions in the structure of the embodiment 2 are the same as that in printer 1, their explanations are omitted.

The scanner 32 includes a printer communication section 17, a scanner main controlling section 18, a read controlling section 19 and a scan band data storing 30. The following is to only explain the different part from that in embodiment 1. Regarding the same parts as that in embodiment 1, they are assigned the same symbol and their explanations are omitted.

The scan band data storing 30 is a memory having two areas capable of storing band data in a unit obtained by dividing one page into plural bands. Regarding other parts, because they are the same as that in embodiment 1, their explanations are omitted.

Explanation of Operation:

The multiplex system explained above performs the following operations.

First is to explain content of scanner unit formation information needed for operation explanation.

FIG. 10 is an explanation diagram of scanner unit formation information of embodiment 2 of the present invention.

The scanner unit formation information is formation information stored in the scanner formation information storing section 16 of the printer 31, and is composed of the following respective information.

As shown by FIG. 10, read speed information represents a read speed of the scanner 32. Read data use memory size information represents a size assigned as a storing area size of image data read by the scanner 32. Designation possible resolution (MIN) information represents a minimum value of resolution which can be designated to read and is supported by the scanner 32. Designation possible resolution (MAX) information represents a maximum value of resolution which can be designated to read and is supported by the scanner 32. ADF unit existence/inexistence information represents whether support of Auto Document Feeder (Hereinafter: ADF) in the scanner 32 exists or not. FB unit existence/inexistence information represents whether support of Flat Bed (Hereinafter: FB) in the scanner 32 exists or not.

These information are previously registered in the printer 31. However, it is possible to store these information in the scanner 32, and to obtain them through a communication between the printer 31 and the scanner 32.

Next is to only explain the different operation from the embodiment 1, about operation summary of the multiplex system of the embodiment 2.

In operations of the printer 31, a read controlling process of scanner controlling section 9 instructed to start process and a read start judging process of read start judging section 14 are different from the printer 1 in embodiment 1, therefore, they are explained below.

Figure 11:
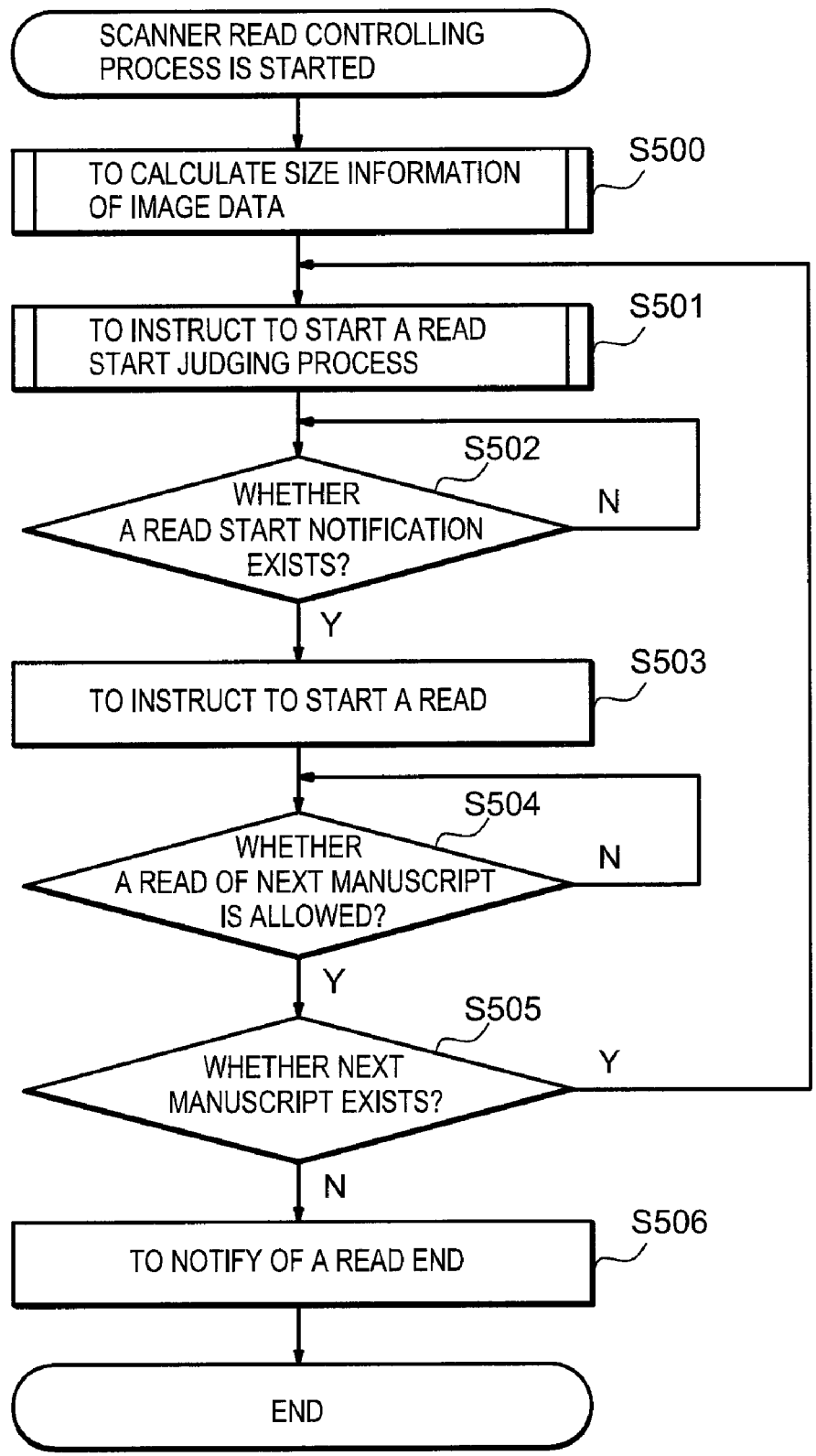
FIG. 11 is a flowchart of read controlling process in embodiment 2 of the present invention.

FIG. 11 is a flowchart of read controlling process in embodiment 2 of the present invention.

Regarding the read controlling process, it will be explained in detail from step S500 to step S506 together with using FIG. 9.

Step S500:

The scanner controlling section 9 sends the information of the read condition to the read data size calculating section 13, and obtains an image data size of one page inputted from the scanner 32.

Step S501:

The scanner controlling section 9 notifies the read start judging section 14 of the read input size obtained from the read data size calculating section 13, and instructs the read start judging section 14 to start a read start judging process. Regarding the content of the read start judging process, it will be explained by using other flowchart after ended the explanation of FIG. 11.

Step S502:

The scanner controlling section 9 waits for a read start allowance notification from the read start judging section 14.

Step S503:

The scanner controlling section 9, after received the read start allowance notification from the read start judging section 14, instructs the scanner 32 to start read via the scanner communicating section 10.

Step S504:

The scanner controlling section 9 waits for a read allowance notification of next manuscript from the scanner 32 via the scanner communicating section 10.

Step S505:

The scanner controlling section 9, after received the read allowance notification of next manuscript from the scanner 32, inquires the scanner 32 whether next manuscript exists or not; if the next manuscript exists, the scanner controlling section 9 returns to step S501 to instruct the read start judging section 14 to start the read start judging process again.

Step S506:

If the next manuscript does not exist, the scanner controlling section 9 sends a read end notification to the printer main controlling section 5 and ends the flow.

Figure 12:
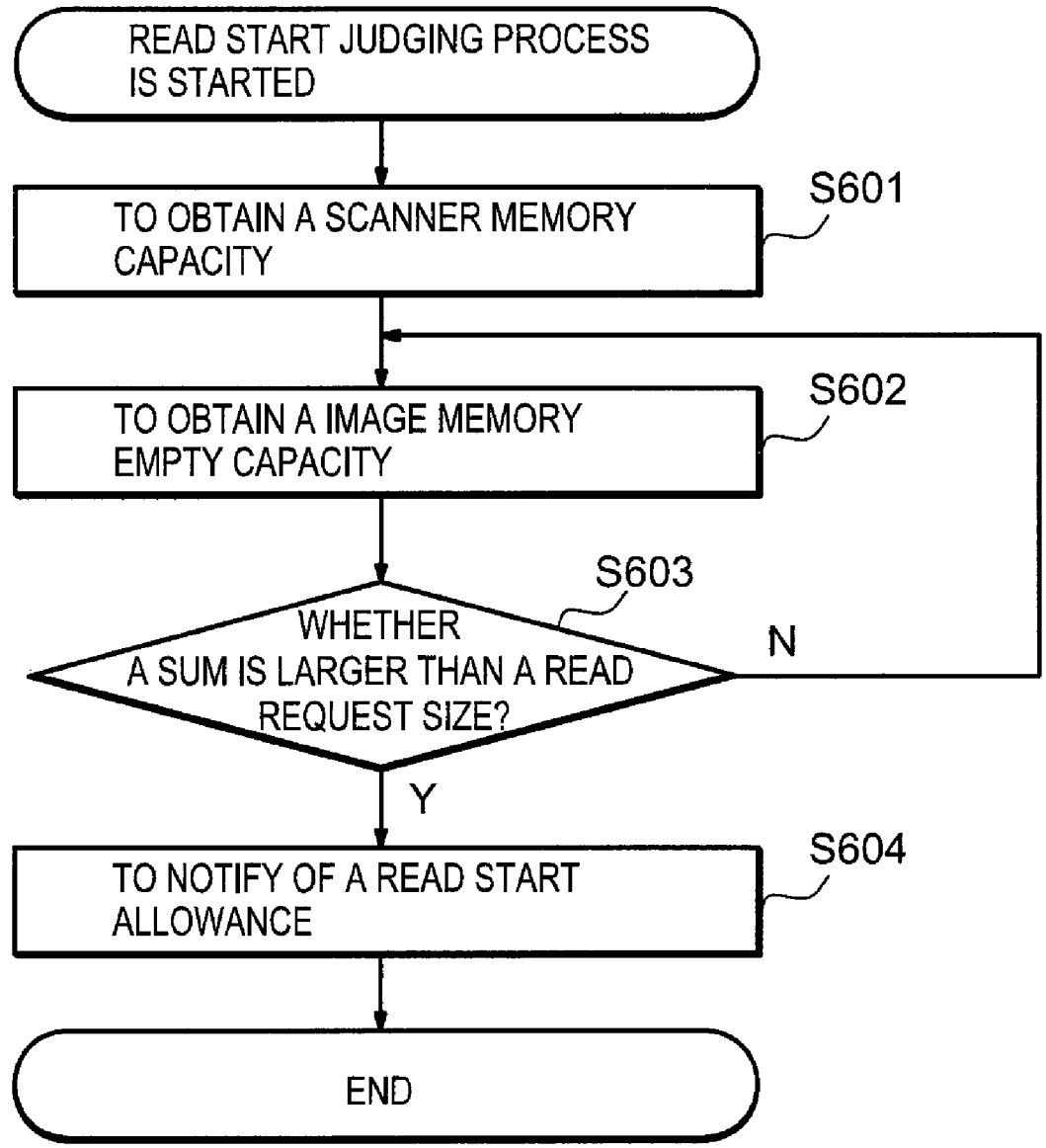
FIG. 12 is a flowchart of read start judging process in embodiment 2 of the present invention.

FIG. 12 is a flowchart of read start judging process in embodiment 2 of the present invention.

Regarding the read start judging process (step S501), it will be explained in detail from step S601 to step S604 according to a step order together with using FIG. 9.

Step S601:

The read start judging section 14 obtains read data use memory size information from the scanner formation information storing section 16.

Step S602:

The read start judging section 14 obtains image memory empty capacity information from the image memory managing section 7.

Step S603:

The read start judging section 14 compares a sum of the read data use memory size information and the image memory empty capacity information with the read input size. If the sum of the read data use memory size information and the image memory empty capacity information is smaller than the read input size, the read start judging section 14 checks again the image memory empty capacity.

Step S604:

The read start judging section 14, if judged that the sum of the read data use memory size information and the image memory empty capacity information is not smaller than the read input size, sends a read start allowance notification to the scanner controlling section 9. The scanner main controlling section 18 of the scanner 32, after received read start instruction command from the printer 31, instructs the read controlling section 19 to read manuscript. The read controlling section 19, after received the read instruction of manuscript, conveys the manuscript according to a read condition; divides image data into band unit; writes the divided image data into the scan band data storing 30; and sends a writing notification to the scanner main controlling section 18. The scanner main controlling section 18, after received the writing notification, sequentially sends band data to the printer 31 in isochronous transfer (synchronous transfer) for keeping transfer band area in a constant. After that, the read controlling section 19 notifies the scanner main controlling section 18 that the read of manuscript is ended. The scanner main controlling section 18, after notified that the read of manuscript is ended, sends a read allowance notification of next manuscript to the printer 31, and ends the flow.

Explanation of Effect

As stated above, according to the embodiment 2, through securing memory corresponding to size part of image data previously inputted from the scanner 32 to the printer 31, and sequentially receiving image data read by the scanner 32, it becomes unnecessary to have to load a memory of one page part of image data. As a result, it is possible to reduce surplus memory capacity and to effectively use memory.

THE UTILIZATION POSSIBILITY IN INDUSTRY

In the above stated explanation, only such case is explained that the present invention is applied to a copying system serving as multiplex system. However, the present invention is not limited in the case, the present invention also can be applied to MFP (Multi Function Products), facsimile system and the like.

Moreover, in the above stated explanation, only such case is explained that the present invention is applied to a copying system serving as multiplex system. However, the present invention is not limited in the case, the present invention may be further applied to a copying apparatus serving as image processing apparatus formed by directly connecting printer and scanner without using USB interface.

The present invention is not limited to the foregoing embodiment or example but many modifications and variations are possible within the spirit and scope of the appended claims of the invention.

What is claimed is:

1. A multiplex system, comprising:
   a scanning device to read a manuscript and generate an image data, the scanning device comprising:
   a storing section for storing the image data; and
   a printing device to print the image data generated by the scanning device, the printing device comprising:
   a transfer ability calculating section that calculates an image data transfer ability between the printing device and the scanning device;
   a data size calculating section that calculates an image data size of one page part read by the scanning device according to a read condition;
   a read ability calculating section that calculates an image data read ability of the scanning device according to the read condition;
   a capacity calculating section that calculates an empty capacity of the storing section;
   a threshold value calculating section that calculates a threshold value on the basis of the image data transfer ability, the image data size and the image data read ability; and
   a scanner controlling section that outputs a read instruction of the manuscript to the scanning device in the case that the empty capacity of the storing section is larger than the threshold value,
   wherein the threshold value calculating section calculates the threshold value according to the formula: threshold value=image data size×(1−(image data transfer ability/image data read ability)).

2. The multiplex system according to claim 1,
   wherein the scanning device starts to read the manuscript according to a read instruction of the printing device.

3. The multiplex system according to claim 1,
   wherein the image data read ability represents a data size of the image data read by the scanning device per second.

4. The multiplex system according to claim 1, wherein the printing device further comprises:
   a receiving section that receives the image data sent from the scanning device; and
   a timer that measures time taken to receive the image data,
   wherein the transfer ability calculating section divides a data size of the received image data by the measured time to calculate the image data transfer ability.

5. The multiplex system according to claim 4,
   wherein the transfer ability calculating section generates and stores transfer ability information indicating the image data transfer ability, and
   wherein in the case that a newly calculated image data transfer ability is smaller than the previously calculated image data transfer ability indicated by the previously stored transfer ability information, the transfer ability calculating section generates a new transfer ability information indicating the newly calculated image data transfer ability and stores the new transfer ability information instead of the previously stored transfer ability information.

6. An image processing apparatus, comprising:
a scanning unit to read a manuscript and generate an image data, the scanning unit comprising:
 a storing section for storing the image data; and
a printing unit to print the image data generated by the scanning unit, the printing unit comprising:
 a transfer ability calculating section that calculates an image data transfer ability between the printing unit and the scanning unit;
 a data size calculating section that calculates an image data size of one page part read by the scanning unit according to a read condition;
 a read ability calculating section that calculates an image data read ability of the scanning unit according to the read condition;
 a capacity calculating section that calculates an empty capacity of the storing section;
 a threshold value calculating section that calculates a threshold value on the basis of the image data transfer ability, the image data size and the image data read ability; and
a scanner controlling section that outputs a read instruction of the manuscript to the scanning unit in the case that the empty capacity of the storing section is larger than the threshold value,
wherein the threshold value calculating section calculates the threshold value according to the formula: threshold value=image data size×(1−(image data transfer ability/image data read ability)).

7. The image processing apparatus according to claim 6, wherein the scanning unit starts to read the manuscript according to a read instruction of the printing unit.

8. The image processing apparatus according to claim 6, wherein the printing unit further has an image data storing section to store the image data to be printed.

9. The image processing apparatus according to claim 8, further comprising:
 a USB interface cable,
 wherein the printing unit and the scanning unit are removably furnished; and the USB interface cable connects the printing unit with the scanning unit and performs communication of the image data from the read data storing section to the image data storing section.

10. The image processing apparatus according to claim 6, wherein the image data read ability represents a data size of the image data read by the scanning unit per second.

11. The image processing apparatus according to claim 6, wherein the printing unit further comprises:
 a receiving section that receives the image data sent from the scanning device; and
 a timer that measures time taken to receive the image data,
 wherein the transfer ability calculating section divides a data size of the received image data by the measured time to calculate the image data transfer ability.

12. The image processing apparatus according to claim 11, wherein the transfer ability calculating section generates and stores transfer ability information indicating the image data transfer ability, and
wherein in the case that a newly calculated image data transfer ability is smaller than the previously calculated image data transfer ability indicated by the previously stored transfer ability information, the transfer ability calculating section generates a new transfer ability information indicating the newly calculated image data transfer ability and stores the new transfer ability information instead of the previously stored transfer ability information.

* * * * *